(12) United States Patent
Pokhil et al.

(10) Patent No.: US 7,298,587 B2
(45) Date of Patent: Nov. 20, 2007

(54) ROUNDED TOP POLE

(75) Inventors: Taras G. Pokhil, Arden Hills, MN (US); Ned Tabat, Chanhassen, MN (US); Martin L. Plumer, Bloomington, MN (US); Steven P. Bozeman, Savage, MN (US); Nurul Amin, Woodbury, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 708 days.

(21) Appl. No.: 10/309,682

(22) Filed: Dec. 4, 2002

(65) Prior Publication Data

US 2004/0021985 A1 Feb. 5, 2004

Related U.S. Application Data

(60) Provisional application No. 60/401,163, filed on Aug. 5, 2002.

(51) Int. Cl.
*G11B 5/147* (2006.01)

(52) U.S. Cl. .................................................. 360/126

(58) Field of Classification Search ............... None
See application file for complete search history.

(56) References Cited

U.S. PATENT DOCUMENTS

| | | | | |
|---|---|---|---|---|
| 4,556,925 A | * | 12/1985 | Suenaga et al. | 360/327 |
| 4,589,042 A | * | 5/1986 | Anderson et al. | 360/125 |
| 4,750,072 A | * | 6/1988 | Takagi | 360/126 |
| 4,750,781 A | * | 6/1988 | Betteridge | 296/214 |
| 4,970,615 A | * | 11/1990 | Gau | 360/122 |
| 4,970,616 A | * | 11/1990 | Ramaswamy | 360/122 |
| 5,032,945 A | * | 7/1991 | Argyle et al. | 360/126 |
| 5,126,232 A | * | 6/1992 | Gau | 430/320 |
| 5,134,535 A | * | 7/1992 | Mallary | 360/126 |
| 5,379,172 A | * | 1/1995 | Liao | 360/126 |
| 5,388,019 A | | 2/1995 | Argyle et al. | 360/126 |
| 5,406,434 A | | 4/1995 | Amin et al. | 360/126 |
| 5,581,429 A | | 12/1996 | Furuichi et al. | |
| 5,600,519 A | * | 2/1997 | Heim et al. | 360/126 |
| 5,726,841 A | * | 3/1998 | Tong et al. | 360/122 |
| 5,872,693 A | | 2/1999 | Yoda et al. | |

(Continued)

FOREIGN PATENT DOCUMENTS

EP 0389143 A2 11/1997

(Continued)

OTHER PUBLICATIONS

English Machine translation of Toru et al. (JP 2002-197908).*

*Primary Examiner*—Angel Castro
*Assistant Examiner*—Christopher R. Magee
(74) *Attorney, Agent, or Firm*—Kinney & Lange, P.A.

(57) ABSTRACT

A magnetic recording head having an air bearing surface for confronting a surface of a rotating disc and comprising a pole tip and a generally rounded and substantially planar body attached to the pole tip is disclosed. The width of the pole tip defines a track width of data written to the rotating disc. The generally rounded shape of the top pole body is such that top pole magnetization gradually changes its direction and follows the edges of the body. Further, the pole tip has low remanence, gradual spin structure and no domain walls formed near the pole tip.

33 Claims, 5 Drawing Sheets

U.S. PATENT DOCUMENTS

| | | | |
|---|---|---|---|
| 6,125,010 A * | 9/2000 | Keel et al. | 360/126 |
| 6,560,068 B1 * | 5/2003 | Sasaki | 360/126 |
| 6,624,971 B1 * | 9/2003 | Sasaki | 360/126 |
| 6,735,062 B1 * | 5/2004 | Pokhil et al. | 360/324.12 |
| 6,742,241 B1 * | 6/2004 | Sasaki | 29/603.07 |
| 6,798,616 B1 * | 9/2004 | Seagle et al. | 360/126 |
| 6,809,899 B1 * | 10/2004 | Chen et al. | 360/125 |

FOREIGN PATENT DOCUMENTS

| | | |
|---|---|---|
| GB | 2268617 A | 6/1993 |
| JP | 100105917 A | 9/1996 |
| JP | 2000048317 A | 8/1998 |
| JP | 20022197608 A | 7/2002 |

* cited by examiner

ROUNDED TOP POLE

CROSS-REFERENCE TO RELATED APPLICATION(S)

This application claims priority from Provisional Application No. 60/401,163 filed Aug. 5, 2002, for "Rounded Top Pole" by Taras G. Pokhil, Ned Tabat, Martin L. Plumer, Steven P. Bozeman, and Nurul Amin.

BACKGROUND OF THE INVENTION

The present invention relates generally to the field of magnetic data storage and retrieval systems. More particularly, the present invention relates to a magnetic recording head with a writer portion having a rounded top pole.

In an electronic data storage and retrieval system, a transducing head typically includes a writer for storing magnetically-encoded information on a magnetic disc and a reader for retrieving that magnetically-encoded information from the magnetic disc. The reader typically consists of two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole near the write gap at the air bearing surface.

In magnetic recording, it is desirable to improve the areal density at which information can be recorded and reliably read. This desire has led to a trend toward shorter bit length along a magnetic recording track and a shrinking track width. Narrow track widths are achieved by use of narrow pole tips at an air bearing surface (ABS) of the head. However, the pole width must be large in the body region of the head where the coil passes between the poles. The larger pole width is necessary to gain adequate magnetic flux through the poles by the coil write current. Hence, it is common to taper the pole from the larger width in the body region to a narrower width in the pole tip region at the ABS.

The top pole in conventional writer designs has a generally triangular shape in the pole tip area. Furthermore, the top pole is typically made of materials that do not have strong intrinsic uniaxial anisotropy. As a result, the shape anisotropy of the top pole is a dominating factor governing domain formation in the top pole. Shape anisotropy of the top pole in the pole tip area results in formation of a domain wall pinned at or near the pole tip. Also, magnetic flux from domains adjacent to the pole tip induces a high remanence in the pole tip. This can result in on-track erasure of data. Plus, magnetization reversal in the pole tip coincides with domain wall motion across the tip. Thus, in conventional top pole designs domain wall motion can be rather slow and irregular and, consequently, magnetization reversal in the pole tip can also be slow.

Therefore, a top pole is needed in which faster magnetization reversal occurs and in which domain walls do not form in the pole tip area.

BRIEF SUMMARY OF THE INVENTION

The present invention is a magnetic recording head having an air bearing surface for confronting a surface of a rotating disc and comprising a pole tip and a generally rounded and substantially planar body attached to the pole tip. The width of the pole tip defines a track width of data written to the rotating disc. The generally rounded shape of the top pole body is such that top pole magnetization gradually changes its direction and follows the edges of the body. Further, the pole tip has low remanence (to reduce the possibility of on-track erasure), gradual domain spin structure (for increased switching speed and repeatability) and no domain walls formed near the pole tip.

DETAILED DESCRIPTION

Figure 1:
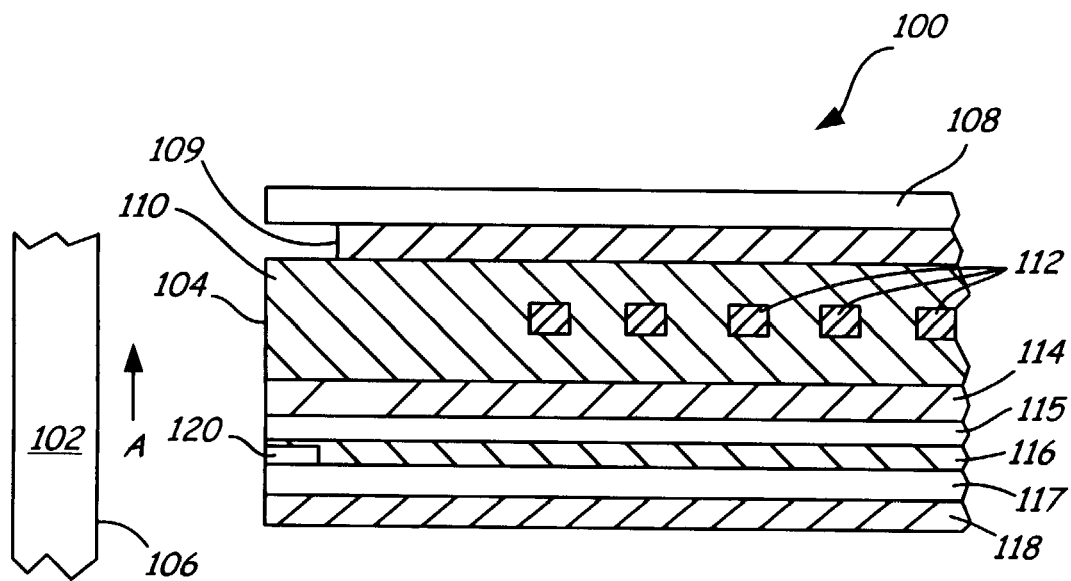
FIG. 1 is a cross-sectional view of a magnetic read/write head and magnetic disc taken along a plane normal to an air bearing surface of the read/write head.

FIG. 1 is a cross-sectional view of magnetic read/write head 100 and magnetic disc 102 taken along a plane normal to air bearing surface 104 of read/write head 100. Air bearing surface 104 of magnetic read/write head 100 faces disc surface 106 of magnetic disc 102. Magnetic disc 102 travels or rotates in a direction relative to magnetic read/write head 100 as indicated by arrow A. Spacing between air bearing surface 104 and disc surface 106 is preferably minimized while avoiding contact between magnetic read/write head 100 and magnetic disc 102.

A writer portion of magnetic read/write head 100 includes top pole 108, yoke 109, insulator 110, conductive coils 112 and bottom pole/top shield 114. Conductive coils 112 are held in place between yoke 109 and top shield 114 by use of insulator 110. Conductive coils 112 are shown in FIG. 1 as one layer of coils but may also be formed of more layers of coils as is well known in the field of magnetic read/write head design.

A reader portion of magnetic read/write head 100 includes bottom pole/top shield 114, top gap layer 115, metal contact layer 116, bottom gap layer 117, bottom shield 118, and giant magnetoresistive (GMR) stack 120. Metal contact layer 116 is positioned between top gap layer 115 and bottom gap layer 117. GMR stack 120 is positioned between terminating ends of metal contact layer 116 and bottom gap layer 117. Top gap layer 115 is positioned between bottom pole/top shield 114 and metal contact layer 116. Bottom gap layer 117 is positioned between metal contact layer 116 and bottom shield 118. Bottom pole/top shield 114 functions both as a shield and as a shared pole for use in conjunction with top pole 108.

Figure 2:
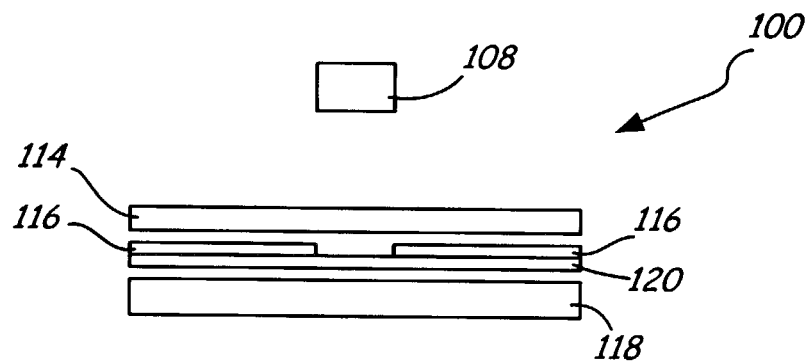
FIG. 2 is a layer diagram of an air bearing surface of a magnetic read/write head.

FIG. 2 is a layer diagram of air bearing surface 104 of magnetic read/write head 100. FIG. 2 illustrates the location of magnetically significant elements in magnetic read/write head 100 as they appear along air bearing surface 104 of magnetic read/write head 100 of FIG. 1. In FIG. 2, all spacing and insulating layers of magnetic read/write head 100 are omitted for clarity. Bottom shield 118 and bottom pole/top shield 114 are spaced to provide for a location of GMR stack 120. GMR stack 120 has two passive regions defined as the portions of GMR stack 120 adjacent to metal contact layer 116. An active region of GMR stack 120 is defined as the portion of GMR stack 120 located between the two passive regions of GMR stack 120. The active region of GMR stack 120 defines a read sensor width.

Figure 3:
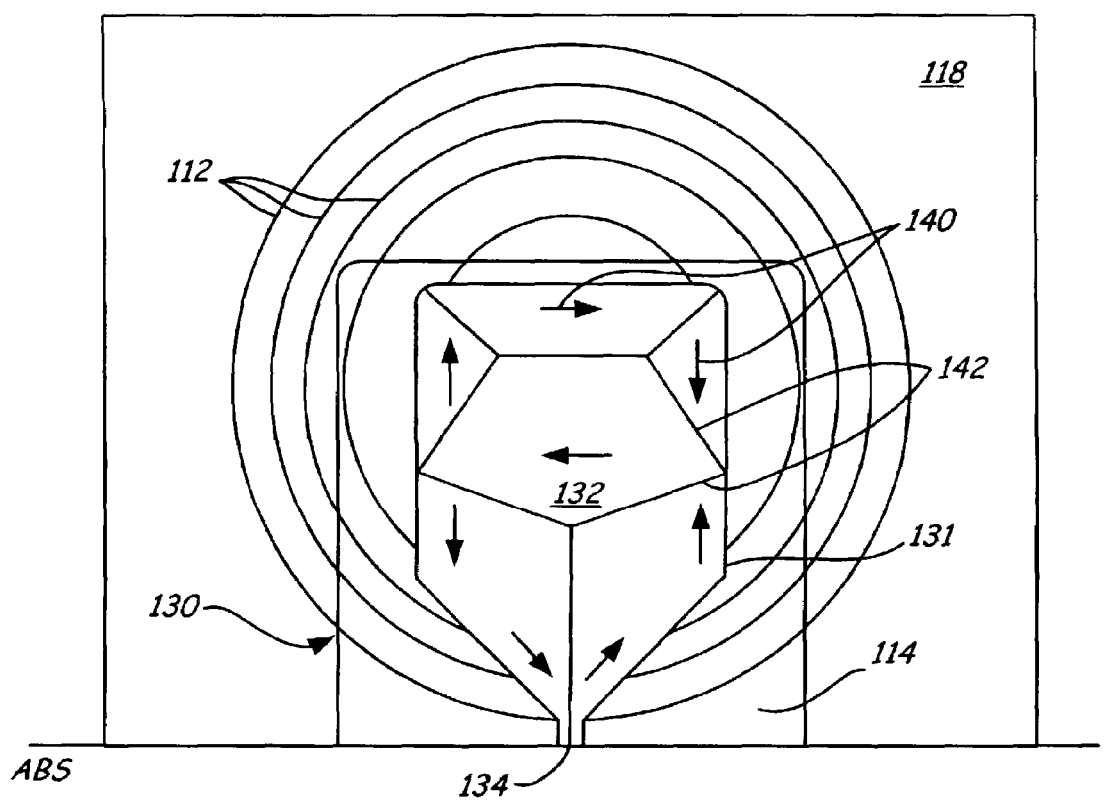
FIG. 3 is a top view of a prior art writer portion including top pole having a triangular shape near the pole tip.

FIG. 3 is a top view of a prior art writer portion 130 including top pole 131. Top pole 131 includes pole body 132 and pole tip 134. Top pole 131 is located in the same position as top pole 108 in magnetic read/write head 100 of FIG. 1. Also shown is FIG. 3 are conductive coils 112, shared pole/top shield 114, and bottom shield 118.

Pole body 132 has a triangular shape at the end of pole body 132 near pole tip 134. Pole tip 134 defines the track width of data written to magnetic disc 102. Typically, top poles are made of materials with high magnetic moments that do not have strong intrinsic uniaxial anisotropy. Consequently, the shape anisotropy of top pole 131 is a dominating factor governing formation of domains 140 in top pole 131. A domain is a local region of the material in which all atomic moments are pointing in the same direction. The direction that the magnetization takes within a domain in the absence of an external magnetic field is represented by the easy axes of the particles of the material. This is what is depicted by domains 140. Shape anisotropy of top pole 131 at pole tip 134 results in formation of domain walls 142 pinned at or near pole tip 134. Domain walls 142 are very narrow regions in which the magnetization changes from its direction in one domain to its direction in an adjacent domain. Thus, domain walls 142 form at pole tip 134 because of the abrupt change in magnetization direction at or near pole tip 134. Magnetic flux from domains near pole tip 134 and domain walls 142 pinned at pole tip 134 induces a high remanent magnetic moment in pole tip 134. This undesirable flux can result in on-track erasure.

In order to write data to a magnetic disc, magnetization in pole tip 134 must be reversed as the state of data written to the disc is to be reversed. Magnetization reversal of pole tip 134 is controlled by domain wall motion across pole tip 134. Domain walls 142 move in response to an applied magnetic field (which results from current applied to conductive coils 112). In top pole 131, with a triangular shape near pole tip 134, domain wall motion can be rather slow and irregular (compared to magnetization rotation) and therefore magnetization reversal is slowed in pole tip 134.

Figure 4:
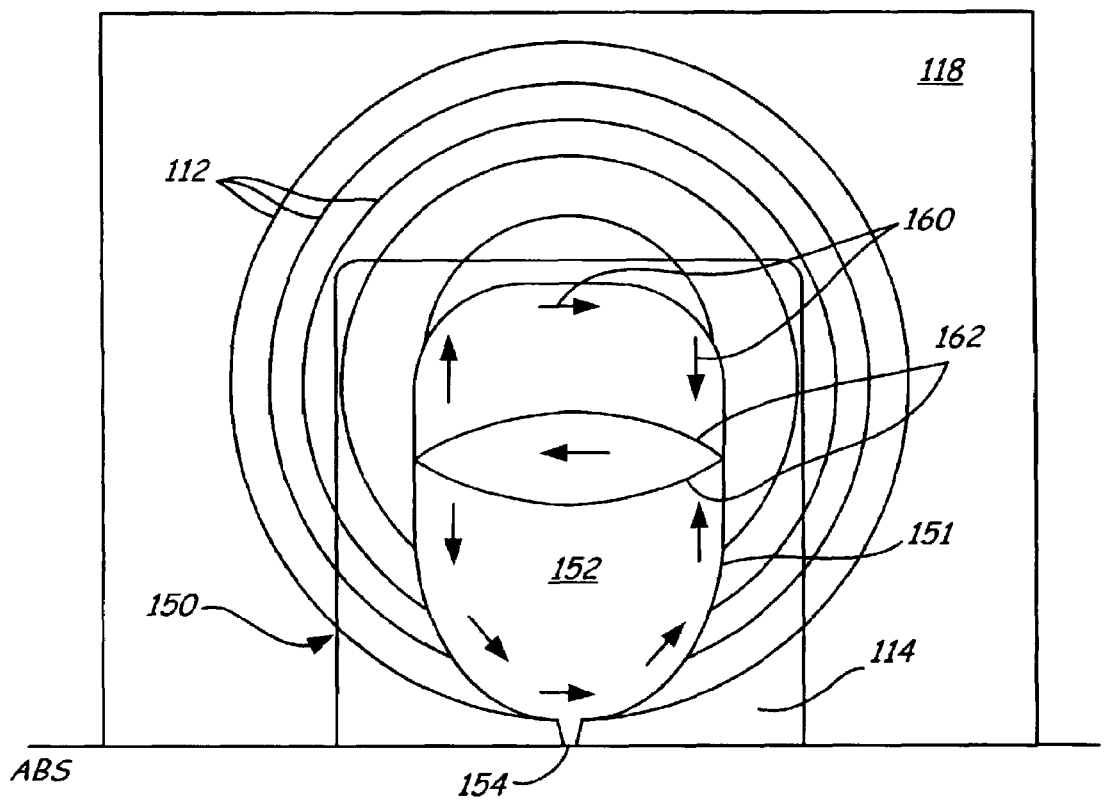
FIG. 4 is a top view of a writer portion including a rounded top pole according to a first embodiment of the present invention.
Figure 5:
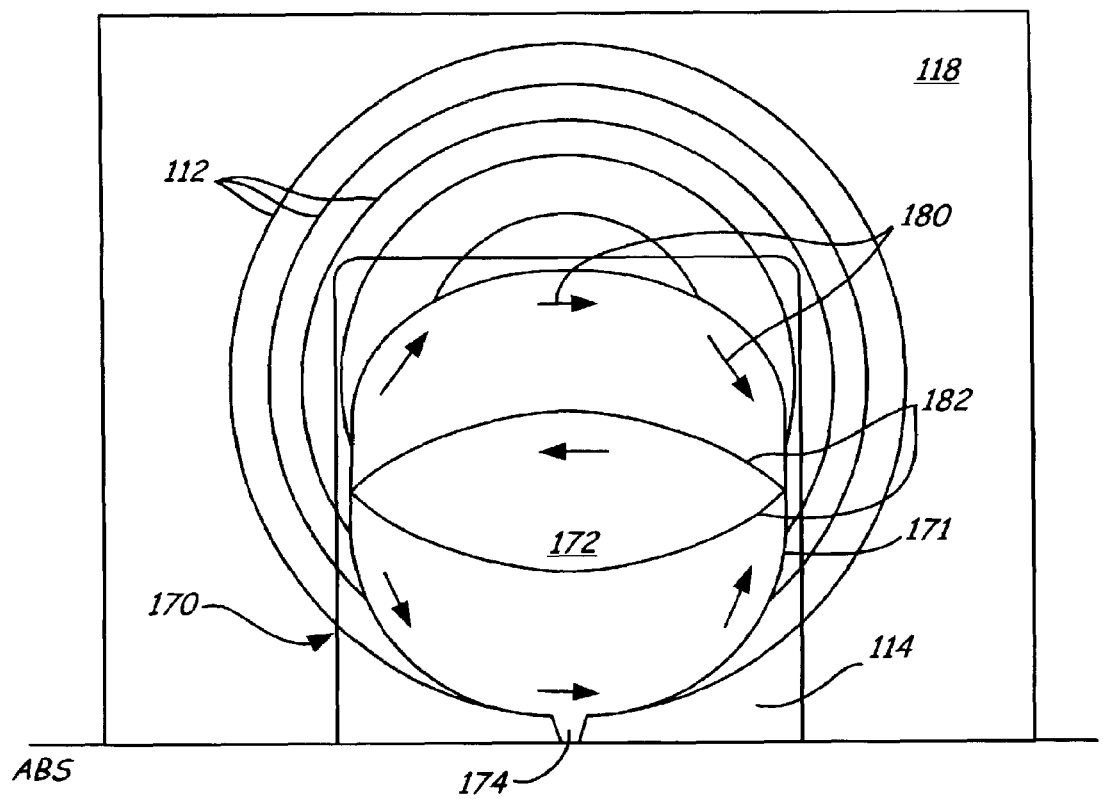
FIG. 5 is a top view of a writer portion including a rounded top pole according to a second embodiment of the present invention.
Figure 6:
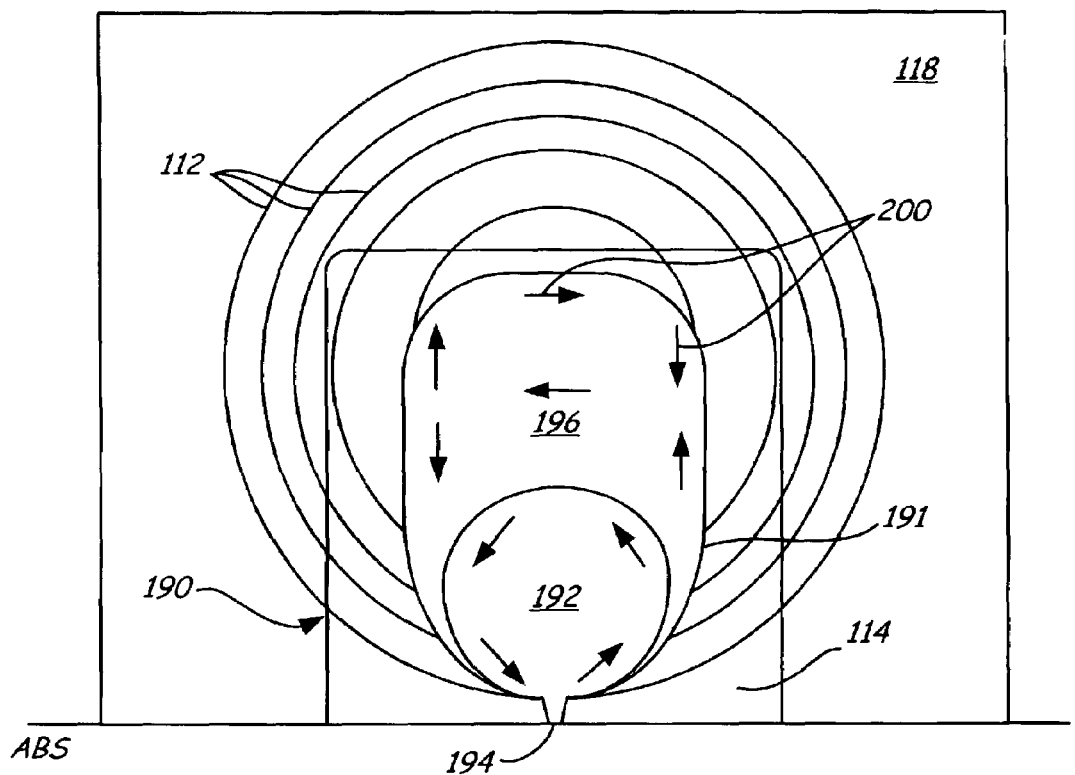
FIG. 6 is a top view of a writer portion including a rounded top pole according to a third embodiment of the present invention.

FIGS. 4, 5, and 6 are top views of a writer portion including a planar rounded top pole according to the present invention. FIG. 4 is a top view of writer portion 150, including rounded top pole 151 according to a first embodiment of the present invention. Rounded top pole 151 is located in the same position as top pole 108 in magnetic read/write head 100 of FIG. 1. Top pole 151 includes pole body 152 and pole tip 154. Pole body 152 typically has a generally elliptical shape. Writer portion 150 also preferably includes a yoke (like yoke 109 in FIG. 1) which matches the shape of pole body 152. Also shown are conductive coils 112, shared pole/top shield 114, and bottom shield 118 (to show the relationship of rounded top pole 151 to the components within magnetic read/write head 100 in FIG. 1).

Top pole 151 is elongated along an axis perpendicular to the air bearing surface, and thus has shape anisotropy perpendicular to the air bearing surface. Top pole 151 is typically composed of a high magnetic moment material with low coercivity and magnetostriction, such as $Ni_{45}Fe_{55}$, CoFe, CoNiFe and FeTaN. In top pole 151, magnetization gradually changes its direction when under the influence of an applied magnetic field (which results from current applied to conductive coils 112), and domains 160 follow the edges of pole body 152. The direction that the magnetization takes within a domain in the absence of an external magnetic field is represented by the easy axes of the particles of the material. This is what is depicted by domains 160. Because domains 160 follow the edges of pole body 152, only two magnetic vortex states are formed (one at the top and one at the bottom of pole body 152). Also, because domain walls 162 form only where magnetization changes direction, no domain walls form at or near pole tip 154 as in the prior art design shown in FIG. 3. This type of domain structure is very stable and repeatable. That is, since the spin structures in the pole tip area are gradual and domain walls 162 do not form near pole tip 154, domains 160 return to their unbiased state quickly when the applied magnetic field is removed. Furthermore, magnetization reversal of domains 160 in top pole 151 is characterized by a nearly linear, low coercivity hysteresis loop when the applied magnetic field limits are lower than the saturating field (which must occur for top pole operation). Domains 160, which form in rounded top pole designs, also do not support high remanence in pole tip 154 (since domain walls 162 do not form at or near pole tip 154). This low remanence in pole tip 154 reduces the probability of on-track erasure.

In operation, data is written to magnetic disc 102 by inducing domain rotation in top pole 151. This is accomplished by causing current to flow through conductive coils 112, thereby inducing a magnetic field in top pole 151. Domains 160 rotate to align with this magnetic field (and the center of the domain vortices concurrently shifts to align with the magnetic field), allowing a first state of data to be written to magnetic disc 102. The magnetic flux which flows through pole tip 154 as a result of domain rotation defines the state of data written. Pole tip 154 defines the track width of data written to magnetic disc 102. A second state of data is written to magnetic disc 102 by reversing the flow of current in conductive coils 112. This causes domains 160 to rotate to point toward the opposite direction, consequently writing an opposite data state to magnetic disc 102. The rounded top pole design is advantageous in that magnetization reversal is due to rotation of domains 160. This differs from conventional top pole designs (FIG. 3), which require domain wall motion for magnetization reversal. Domain wall motion requires more energy and a stronger magnetic field than does magnetization reversal of domains 160. Thus, the rounded top pole design allows for faster switching and is more reproducible than conventional top pole designs, since domains 160 quickly rotate to align with an applied magnetic field. A yoke, typically comprised of a high resistivity material, is preferably provided between top pole 151 and conductive coils 112 to increase the amount of flux which flows through pole tip 154. Furthermore, a rounded top pole design allows for better magnetic flux closure within the top pole than conventional top pole designs. As a result, less flux leaks from the top pole into shared pole 114. Consequently, the probability of formation of unwanted spin structures in shared pole 114 is reduced.

FIG. 5 is a top view of writer portion 170, including rounded top pole 171 according to a second embodiment of the present invention. Rounded top pole 171 is located in the same position as top pole 108 in magnetic read/write head 100 of FIG. 1. Top pole 171 includes pole body 172 and pole tip 174. Writer portion 170 also preferably includes a yoke (like yoke 109 in FIG. 1) which matches the shape of pole body 172. Also shown are conductive coils 112, shared pole/top shield 114, and bottom shield 118 (to show the relationship of rounded top pole 171 to the components within magnetic read/write head 100 in FIG. 1).

Top pole 171 is elongated along an axis parallel to the air bearing surface, and thus has shape anisotropy parallel to the air bearing surface. Top pole 171 is typically composed of a high magnetic moment material with low coercivity and magnetostriction, such as $Ni_{45}Fe_{55}$, CoFe, CoNiFe and FeTaN. In top pole 171, magnetization gradually changes its direction when under the influence of an applied magnetic field (which results from current applied to conductive coils 112), and domains 180 follow the edges of pole body 172. The direction that the magnetization takes within a domain in the absence of an external magnetic field is represented by the easy axes of the particles of the material. This is what is depicted by domains 180. Because domains 180 follow the edges of pole body 172, only two magnetic vortex states are formed (one at the top and one at the bottom of pole body 172). Also, because domain walls 182 form only where magnetization changes direction, no domain walls form at or near pole tip 174 as in the prior art design shown in FIG. 3. This type of domain structure is very stable and repeatable. That is, since the spin structures in the pole tip area are gradual and domain walls 182 do not form near pole tip 174, domains 180 return to their unbiased state quickly when the applied magnetic field is removed. Furthermore, magnetization reversal of domains 180 in top pole 171 is characterized by a nearly linear, low coercivity hysteresis loop when the applied magnetic field limits are lower than the saturating field (which must occur for top pole operation). Domains 180, which form in rounded top pole designs, also do not support high remanence in pole tip 174 (since domain walls do not form at or near pole tip 174). This low remanence in pole tip 174 reduces the probability of on-track erasure.

In operation, data is written to magnetic disc 102 by inducing domain rotation in top pole 171. This is accomplished by causing current to flow through conductive coils 112, thereby inducing a magnetic field in top pole 171. Domains 180 rotate to align with this magnetic field (and the center of the domain vortices concurrently shifts to align with the magnetic field), allowing a first state of data to be written to magnetic disc 102. The magnetic flux which flows through pole tip 174 as a result of domain rotation defines the state of data written. Pole tip 174 defines the track width of data written to magnetic disc 102. A second state of data is written to magnetic disc 102 by reversing the flow of current in conductive coils 112. This causes domains 180 to rotate to point toward the opposite direction, consequently writing an opposite data state to magnetic disc 102. The rounded top pole design is advantageous in that magnetization reversal is due to rotation of domains 180. This differs from conventional top pole designs (FIG. 3), which require domain wall motion for magnetization reversal. Domain wall motion requires more energy and a stronger magnetic field than does magnetization reversal of domains 180. Thus, the rounded top pole design allows for faster switching and is more reproducible than conventional top pole designs, since domains 180 quickly rotate to align with an applied magnetic field. Also, a yoke (typically comprised of a high resistivity material) is preferably provided between top pole 171 and conductive coils 112 to increase the amount of flux which flows through pole tip 174. Furthermore, a rounded top pole design allows for better magnetic flux closure within the top pole than conventional top pole designs. As a result, less flux leaks from the top pole into shared pole 114. Consequently, the probability of formation of unwanted spin structures in shared pole 114 is reduced.

FIG. 6 is a top view of writer portion 190, including rounded top pole 191 according to a third embodiment of the present invention. Rounded top pole 191 is located in the same position as top pole 108 in magnetic read/write head 100 of FIG. 1. Top pole 191 includes pole body 192 and pole tip 194. Writer portion 190 also preferably includes yoke 196, which has a larger surface area than top pole 191. Also shown are conductive coils 112, shared pole/top shield 114, and bottom shield 118 (to show the relationship of rounded top pole 191 to the components within magnetic read/write head 100 in FIG. 1).

Top pole 191 has a substantially circular shape, and thus does not have shape anisotropy either parallel or perpendicular to the air bearing surface. Top pole 191 is typically composed of a high magnetic moment material with low coercivity and magnetostriction, and high permeability and electrical resistivity, such as $Ni_{45}Fe_{55}$, CoFe, CoNiFe and FeTaN. In top pole 191, magnetization gradually changes its direction when under the influence of an applied magnetic field (which results from current applied to conductive coils 112), and domains 200 follow the edges of pole body 192. The direction that the magnetization takes within a domain in the absence of an external magnetic field is represented by the easy axes of the particles of the material. This is what is depicted by domains 160. Because domains 200 follow the edges of pole body 192, only one magnetic vortex state forms. Also, because domain walls form only where magnetization changes direction, no domain walls form at or near pole tip 194 as in the prior art design shown in FIG. 3. This type of domain structure is very stable and repeatable. That is, since the spin structures in the pole tip area are gradual and domain walls do not form near pole tip 194, domains 200 return to their unbiased state quickly when the applied magnetic field is removed. Furthermore, magnetization reversal of domains 200 in top pole 191 is characterized by a nearly linear, low coercivity hysteresis loop when the applied magnetic field limits are lower than the saturating field (which must occur for top pole operation). Domains 200, which form in rounded top pole designs, also do not support high remanence in pole tip 194 (since domain walls do not form at or near pole tip 194). This low remanence in pole tip 194 reduces the probability of on-track erasure.

In operation, data is written to magnetic disc 102 by inducing domain rotation in top pole 191. This is accomplished by causing current to flow through conductive coils 112, thereby inducing a magnetic field in top pole 191. Domains 200 rotate to align with this magnetic field (and the center of the domain vortex concurrently shifts to align with the magnetic field), allowing a first state of data to be written to magnetic disc 102. The magnetic flux which flows through pole tip 194 as a result of domain rotation defines the state of data written. Pole tip 194 defines the track width of data written to magnetic disc 102. A second state of data is written to magnetic disc 102 by reversing the flow of current in conductive coils 112. This causes domains 200 to rotate to point toward the opposite direction, consequently writing an opposite data state to magnetic disc 102. The rounded top pole design is advantageous in that magnetization reversal is due to rotation of domains 200. This differs from conventional top pole designs (FIG. 3), which require domain wall motion for magnetization reversal. Domain wall motion requires more energy and a stronger magnetic field than does magnetization reversal of domains 200. Thus, the rounded top pole design allows for faster switching and is more reproducible than conventional top pole designs, since domains 200 quickly rotate to align with an applied magnetic field. Also, yoke 196 (typically comprised of a high resistivity material) is preferably provided between top pole 191 and conductive coils 112 to increase the amount of flux which flows through pole tip 194. Furthermore, a rounded top pole design allows for better magnetic flux closure within the top pole than conventional top pole designs. As a result, less flux leaks from the top pole into shared pole 114. Consequently, the probability of formation of unwanted spin structures in shared pole 114 is reduced.

As can be seen, top pole 151 of FIG. 4, top pole 171 of FIG. 5 and top pole 191 of FIG. 6 have substantially the same operation. The main differences between the different embodiments are the direction of elongation (shape anisotropy) of the top poles relative to the air bearing surface and the number of natural domain vortices that form in the pole body. Top pole 151, top pole 171 and top pole 191 are provided as illustrative of the varying designs a rounded top pole may possess, the shape and size of which can be adjusted as specifications of magnetic read/write head 100 dictate. For example, varying the size of conductive coils 112 may necessitate altering the size of the top pole. Furthermore, the rounded top pole design is not limited to the three embodiments provided heretofore. That is, the top pole may have any shape or size with rounded edges.

The present invention is a magnetic read/write head having a top pole with a rounded (typically generally elliptical) pole body and a pole tip. In rounded top poles, magnetization gradually changes its direction when under the influence of an applied magnetic field, and magnetic domains in the top pole follow the edges of the pole body. Because the domains follow the edges of the pole body, few magnetic vortex states form in the pole body. Also, because domain walls form only where magnetization changes direction, no domain walls form at or near pole tip.

This type of domain structure is very stable and repeatable. That is, since the spin structures in the pole tip area are gradual and domain walls do not form near the pole tip, the domains return to their unbiased state quickly when the applied magnetic field is removed. Furthermore, magnetization reversal of the domains in the rounded top pole is characterized by a nearly linear, low coercivity hysteresis loop when the applied magnetic field limits are lower than the saturating field (which is always the case in top pole operation). The domain walls which form in rounded top pole designs also do not support high remanence in pole tip (since the domain walls do not form at or near pole tip). This low remanence in the pole tip reduces the probability of on-track erasure.

Although the present invention has been described with reference to preferred embodiments, workers skilled in the art will recognize that changes may be made in form and detail without departing from the spirit and scope of the invention. For example, the shape of the top pole is not limited to the three embodiments disclosed, and may be fabricated into any shape having rounded edges. Also, the shape and size of the top pole are variable depending on the particular requirements for the writer portion. For example, the dimensions of the top pole are variable as varying coil sizes become necessary. Finally, the rounded top pole design is applicable to longitudinal recording systems as well as perpendicular recording systems.

The invention claimed is:

1. In a thin film head having a read element and a write element, an improved writer top pole comprising:
   a pole tip; and
   a generally rounded and substantially planar body attached to and substantially co-planar with the pole tip, wherein the pole tip has a substantially trapezoidal shape with its major base at the body and its minor base partially defining a medium confronting surface of the pole tip.

2. The thin film head of claim 1, wherein a width of the pole tip defines a track width of data written to a magnetic medium.

3. The thin film head of claim 1, wherein the top pole is formed of a high magnetic moment material.

4. The thin film head of claim 1, wherein the top pole has shape anisotropy perpendicular to the medium confronting surface of the pole tip.

5. The thin film head of claim 1, wherein the top pole has shape anisotropy parallel to the medium confronting surface of the pole tip.

6. A magnetic recording head having a writer top pole comprising:
   a pole tip; and
   a substantially planar body attached to and substantially co-planar with the pole tip, the body having a substantially elliptical shape such that top pole magnetization gradually changes its direction and follows edges of the body, and such that the pole tip has low remanence, gradual spin structure and no domain walls, wherein the pole tip has a substantially trapezoidal shape with its major base at the body and its minor base partially defining a medium confronting surface of the pole tip.

7. The magnetic recording head of claim 6, wherein the top pole has shape anisotropy perpendicular to the medium confronting surface of the pole tip.

8. The magnetic recording head of claim 6, wherein the top pole has shape anisotropy parallel to the medium confronting surface of the pole tip.

9. The magnetic recording head of claim 6, further comprising:
   a conductive coil positioned such that at least a portion of the conductive coil is positioned between a shared pole and the top pole.

10. The magnetic recording head of claim 9, wherein the size of the top pole corresponds to the size of the conductive coil.

11. The magnetic recording head of claim 6, wherein the top pole is formed of a high magnetic moment material.

12. The magnetic recording head of claim 6, wherein the minor base defines a track width of data written to a magnetic medium.

13. A magnetic recording head comprising:
a read element comprising a shared pole; and
a write element comprising a substantially planar top pole including a substantially elliptical body and a pole tip attached to and substantially co-planar with the body, the pole tip having a substantially trapezoidal shape with its major base at the body and its minor base partially defining a medium confronting surface of the pole tip, wherein the top pole is separated from the shared pole by a write gap, and wherein the top pole is in contact with the shared pole.

14. The magnetic recording head of claim 13, further comprising a yoke positioned between the shared pole and the top pole.

15. The magnetic recording head of claim 14, wherein the top pole and the yoke have substantially the same shape.

16. The magnetic recording head of claim 14, wherein the top pole is smaller than the yoke.

17. The magnetic recording head of claim 14, wherein the yoke is formed of a high resistivity material.

18. The magnetic recording head of claim 13, wherein the top pole has shape anisotropy perpendicular to the medium confronting surface of the pole tip.

19. The magnetic recording head of claim 13, wherein the top pole has shape anisotropy parallel to the medium confronting surface of the pole tip.

20. The magnetic recording head of claim 13, further comprising:
a conductive coil positioned such that at least a portion of the conductive coil is positioned between the shared pole and the top pole.

21. The magnetic recording head of claim 20, wherein the size of the top pole corresponds to the size of the conductive coil.

22. The magnetic recording head of claim 13, wherein the top pole is formed of a high magnetic moment material.

23. The magnetic recording head of claim 13, wherein the minor base defines a track width of data written to a magnetic medium.

24. A magnetic recording head comprising:
a bottom shield;
a shared pole;
a read element positioned between the bottom shield and the shared pole;
a substantially planar top pole including a rounded top pole body and a pole tip attached to and substantially co-planar with the body, the pole tip having a substantially trapezoidal shape with its major base at the body and its minor base partially defining a medium confronting surface of the pole tip, wherein the top pole is separated from the shared pole by a write gap, and wherein the top pole is in contact with the shared pole; and
a conductive coil positioned such that at least a portion of the conductive coil is positioned between the shared pole and the top pole.

25. The magnetic recording head of claim 24, further comprising a yoke positioned between the shared pole and the top pole.

26. The magnetic recording head of claim 25, wherein the top pole and the yoke have substantially the same shape.

27. The magnetic recording head of claim 25, wherein the top pole is smaller than the yoke.

28. The magnetic recording head of claim 25, wherein the yoke is formed of a high resistivity material.

29. The magnetic recording head of claim 24, wherein the top pole has shape anisotropy perpendicular to the medium confronting surface of the pole tip.

30. The magnetic recording head of claim 24, wherein the top pole has shape anisotropy parallel to the medium confronting surface of the pole tip.

31. The magnetic recording head of claim 24, wherein the size of the top pole corresponds to the size of the conductive coil.

32. The magnetic recording head of claim 24, wherein the top pole is formed of a high magnetic moment material.

33. The magnetic recording head of claim 26, wherein the minor base defines a track width of data written to a magnetic medium.

* * * * *